United States Patent [19]
Nguyen

[11] Patent Number: 5,790,881
[45] Date of Patent: Aug. 4, 1998

[54] COMPUTER SYSTEM INCLUDING COPROCESSOR DEVICES SIMULATING MEMORY INTERFACES

[75] Inventor: Julien T. Nguyen, Redwood City, Calif.

[73] Assignee: Sigma Designs, Inc., Fremont, Calif.

[21] Appl. No.: 385,249

[22] Filed: Feb. 7, 1995

[51] Int. Cl.[6] ................................................. G06F 9/44
[52] U.S. Cl. ................... 395/800.34; 395/500; 395/503; 395/527
[58] Field of Search ................................. 395/162, 163, 395/134, 135, 800.34, 500, 503, 527

[56] References Cited

U.S. PATENT DOCUMENTS

| | | | |
|---|---|---|---|
| 3,846,762 | 11/1974 | Gregory et al. | 341/126 |
| 3,947,826 | 3/1976 | Bockwoldt | 348/441 |
| 4,353,057 | 10/1982 | Bernet et al. | 341/136 |
| 4,394,650 | 7/1983 | Long et al. | 45/23 |
| 4,425,581 | 1/1984 | Schweppe et al. | 348/570 |
| 4,528,561 | 7/1985 | Kitamura | 345/195 |
| 4,587,633 | 5/1986 | Wang et al. | 395/200.64 |
| 4,628,479 | 12/1986 | Borg et al. | 395/479 |
| 4,684,936 | 8/1987 | Brown et al. | 345/116 |
| 4,757,310 | 7/1988 | Katsura et al. | 345/28 |
| 4,779,210 | 10/1988 | Katsura et al. | 395/134 |
| 4,811,205 | 3/1989 | Normington et al. | 395/502 |
| 4,862,392 | 8/1989 | Steiner | 395/127 |
| 4,870,406 | 9/1989 | Gupta et al. | 340/70 |
| 4,876,600 | 10/1989 | Pietzsch et al. | 348/588 |
| 4,905,189 | 2/1990 | Brunolli | 395/501 |
| 4,916,301 | 4/1990 | Mansfield et al. | 345/133 |
| 4,947,257 | 8/1990 | Fernandez et al. | 345/585 |
| 4,947,342 | 8/1990 | Katsura et al. | 395/136 |
| 4,953,101 | 8/1990 | Kelleher et al. | 395/505 |
| 4,994,912 | 2/1991 | Lumelsky et al. | 348/441 |
| 5,046,023 | 9/1991 | Katsura et al. | 395/134 |
| 5,065,346 | 11/1991 | Kawai et al. | 395/128 |
| 5,097,257 | 3/1992 | Clough et al. | 345/132 |
| 5,111,292 | 5/1992 | Kuriacose et al. | 348/384 |
| 5,111,409 | 5/1992 | Gasper et al. | 395/807 |

(List continued on next page.)

FOREIGN PATENT DOCUMENTS

| | | | |
|---|---|---|---|
| 0 384 257 | 8/1990 | European Pat. Off. | G09G 1/16 |
| 0 384 419 | 8/1990 | European Pat. Off. | G09G 1/16 |

OTHER PUBLICATIONS

Brunhoff, Todd; "VEX Provides Mechanism for Integrating Graphics and Video"; Computer Technology Review; 10 Nov. 1990; No. 1, pp. 107–111.

*Primary Examiner*—John E. Harrity
*Assistant Examiner*—John Follansbee
*Attorney, Agent, or Firm*—The Law Offices of Steven A. Swernofsky

[57] ABSTRACT

A method and system for coupling a coprocessor to a master device, in which the coprocessor emulates an memory interface to the master device, like that of a memory device. The coprocessor is coupled to a memory bus and receives memory accesses directed to a set of addresses not covered by memory devices also coupled to the memory bus. The coprocessor is disposed to receive data written from the master device, perform a coprocessing function on that data, and respond to a read data command from the master device with processing results. The coprocessor uses memory block transfers to read data from and write data to memory devices also coupled to the memory bus. A general purpose computer system comprises a central processor and memory coupled to a PCI bus, a graphics processor and graphics memory coupled to the PCI bus, and a coprocessor coupled to the graphics processor and graphics memory. The coprocessor is adapted to compute, in response to data written to it by the graphics processor, a graphical function such as a 3D processing function, MPEG video compression or decompression, a raytracing function, or some related function in support of graphics processing. The coprocessor may communicate with the central processor and its memory using a memory access operation performed by the central processor, and may communicate with the graphics memory using a memory block transfer performed by the graphics processor. The coprocessor may emulate a memory wait condition or memory wait state using read-ready and write-ready flags which are readable by software executing on the general processor.

18 Claims, 2 Drawing Sheets

U.S. PATENT DOCUMENTS

| | | | |
|---|---|---|---|
| 5,122,875 | 6/1992 | Raychaudhuri et al. | 348/390 |
| 5,138,307 | 8/1992 | Tatsumi | 345/121 |
| 5,151,875 | 9/1992 | Sato | 364/784.03 |
| 5,157,716 | 10/1992 | Naddor et al. | 379/92.01 |
| 5,168,356 | 12/1992 | Acampora et al. | 348/409 |
| 5,191,410 | 3/1993 | McCalley et al. | 348/14 |
| 5,191,548 | 3/1993 | Balkanski et al. | 364/725.03 |
| 5,196,946 | 3/1993 | Balkanski et al. | 358/433 |
| 5,208,745 | 5/1993 | Quentin et al. | 364/188 |
| 5,220,312 | 6/1993 | Lumelsky et al. | 345/190 |
| 5,231,492 | 7/1993 | Dangi et al. | 348/17 |
| 5,253,078 | 10/1993 | Balkanski et al. | 358/426 |
| 5,270,832 | 12/1993 | Balkanski et al. | 358/432 |
| 5,289,276 | 2/1994 | Siracusa et al. | 348/469 |
| 5,309,567 | 5/1994 | Mizukami | 395/290 |
| 5,329,630 | 7/1994 | Baldwin | 395/497.64 |
| 5,333,261 | 7/1994 | Guttal et al. | 395/501 |
| 5,341,318 | 8/1994 | Balkanski et al. | 364/725.03 |
| 5,371,861 | 12/1994 | Keener et al. | 395/309 |
| 5,379,356 | 1/1995 | Purcell et al. | 382/233 |
| 5,392,239 | 2/1995 | Margulis et al. | 365/189.01 |
| 5,397,853 | 3/1995 | Koguchi | 434/307 A |
| 5,402,147 | 3/1995 | Chen et al. | 345/115 |
| 5,406,306 | 4/1995 | Siann et al. | 345/115 |
| 5,416,749 | 5/1995 | Lai | 365/240 |
| 5,426,756 | 6/1995 | Shyi et al. | 395/486 |
| 5,434,913 | 7/1995 | Tung et al. | 379/202 |
| 5,446,501 | 8/1995 | Takemoto et al. | 348/620 |
| 5,450,542 | 9/1995 | Lehman | 395/512 |
| 5,450,544 | 9/1995 | Dixon et al. | 395/507 |
| 5,471,576 | 11/1995 | Yee | 395/807 |
| 5,526,503 | 6/1996 | Kim | 395/413 |

COMPUTER SYSTEM INCLUDING COPROCESSOR DEVICES SIMULATING MEMORY INTERFACES

BACKGROUND OF THE INVENTION

1. Field of the Invention

This invention relates to using coprocessor devices to simulate memory interfaces.

2. Description of Related Art

In computer systems using a processor, it often occurs that the processor has a task it is assigned to perform which is more effectively or more efficiently performed by another device, such as a specialized processor (herein called a "coprocessor"). One common example is floating-point arithmetic operations, which are often performed more quickly by a floating-point arithmetic coprocessor.

It also occurs that even a specialized processor may be significantly aided by provision of a coprocessor, such as a general purpose processor dedicated to certain tasks, a second specialized processor designed for certain tasks, or a device designed to add some functionality which is not easily available using the original specialized processor. For example, a graphics processor may be significantly improved by provision of a coprocessor for 3D processing, for JPEG image compression or decompression, for MPEG video compression or decompression, or for raytracing.

One problem which has arisen in the art is that provision of a coprocessor often requires a specialized interface between the processor and coprocessor; this specialized interface generally requires both significant hardware design work, to integrate the coprocessor into the system, and significant software design work, to use the coprocessor with programs executing on the processor.

One method has been to couple the coprocessor to a system bus which is also coupled to the processor, communicating with the processor using device interrupts. While this method achieves the purpose of providing communication between the processor and the coprocessor, it suffers from several drawbacks. First, it requires system resources to be allocated to communication between the processor and coprocessor, including interrupt slots and system bus slots. Second, it requires software executing on the processor to use an interrupt handler architecture, a technique which is sometimes unwieldy, and which may differ with differing operating systems executing on the processor.

Another method has been to couple the coprocessor to a main system bus which is also coupled to the memory, and causing the coprocessor to communicate with the memory like the processor, and to communicate with the processor using shared locations in memory. While this method achieves the purpose of providing communication between the processor and the coprocessor, it suffers from several drawbacks. First, the coprocessor must implement all control signals required for the main system bus, must have the high current drivers for the system bus and must have a high pin count as a result. Second, because the main system bus is generally limited to a lower speed than the memory bus, it limits performance to that lower speed.

Accordingly, it would be advantageous to provide a superior technique for coupling a coprocessor to a master device (such as a graphics processor or other processing element).

SUMMARY OF THE INVENTION

The invention provides a method and system for coupling a coprocessor to a master device (such as a graphics processor or other processing element), in which the coprocessor emulates a memory interface to the master device, like that of a memory device. The coprocessor is coupled to a memory bus and receives memory accesses directed to a set of addresses not already mapped by memory devices also coupled to the memory bus. The coprocessor is disposed to respond to a write data command from the master device by receiving input data written from the master device, perform a coprocessing function on that data, and respond to a read data command from the master device by providing output results. More than one coprocessor may be coupled to a single master device using the same graphics memory bus.

In a preferred embodiment, the coprocessor emulates a memory wait condition or memory wait state using read-ready and write-ready flags which are readable by software executing on the master device. The master device performs memory block transfers to transfer data between the coprocessor and one or more memory devices also coupled to the memory bus, thus providing the memory devices for the coprocessor's own memory purposes.

In a preferred embodiment, a general purpose computer system comprises a central processor and memory coupled to a PCI bus, a graphics processor and graphics memory coupled to the PCI bus, and a coprocessor coupled to the graphics processor and graphics memory. Preferably, the coprocessor is adapted to compute, in response to data written to it by the graphics processor, a graphical function such as a 3D processing function, an JPEG image compression or decompression, an MPEG video compression or decompression, a raytracing function, or a related function in support of graphics processing. The coprocessor communicates with the central processor and its memory using a memory access operation performed by the central processor, and communicates with the graphics memory using a memory block transfer performed by the graphics processor.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

COUPLING A COPROCESSOR TO A PROCESSOR AND MEMORY

Figure 1A:
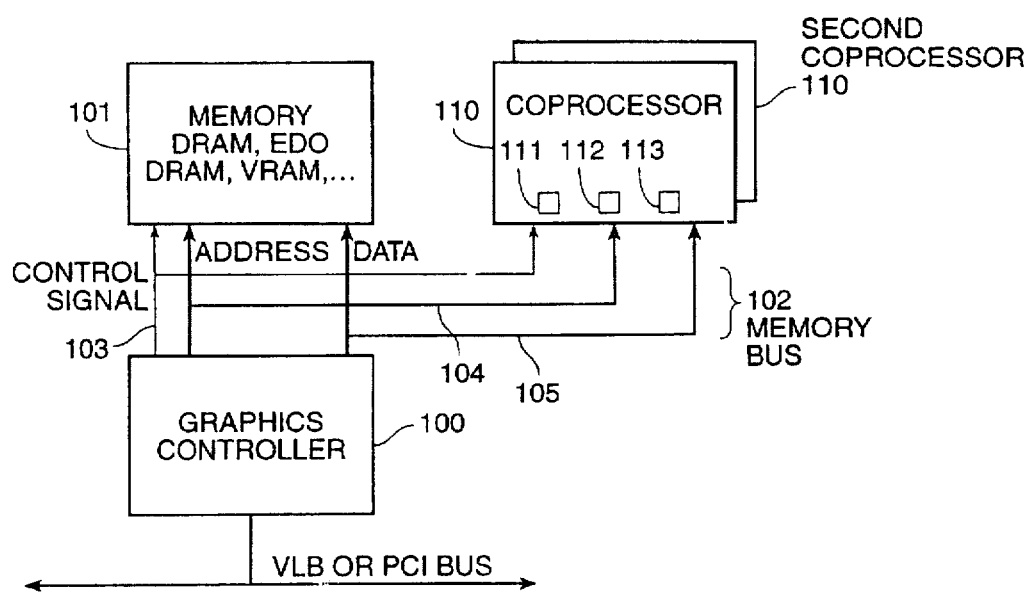
FIG. 1A shows a block diagram of an arrangement for coupling a coprocessor to a processor and a memory.
Figure 1B:
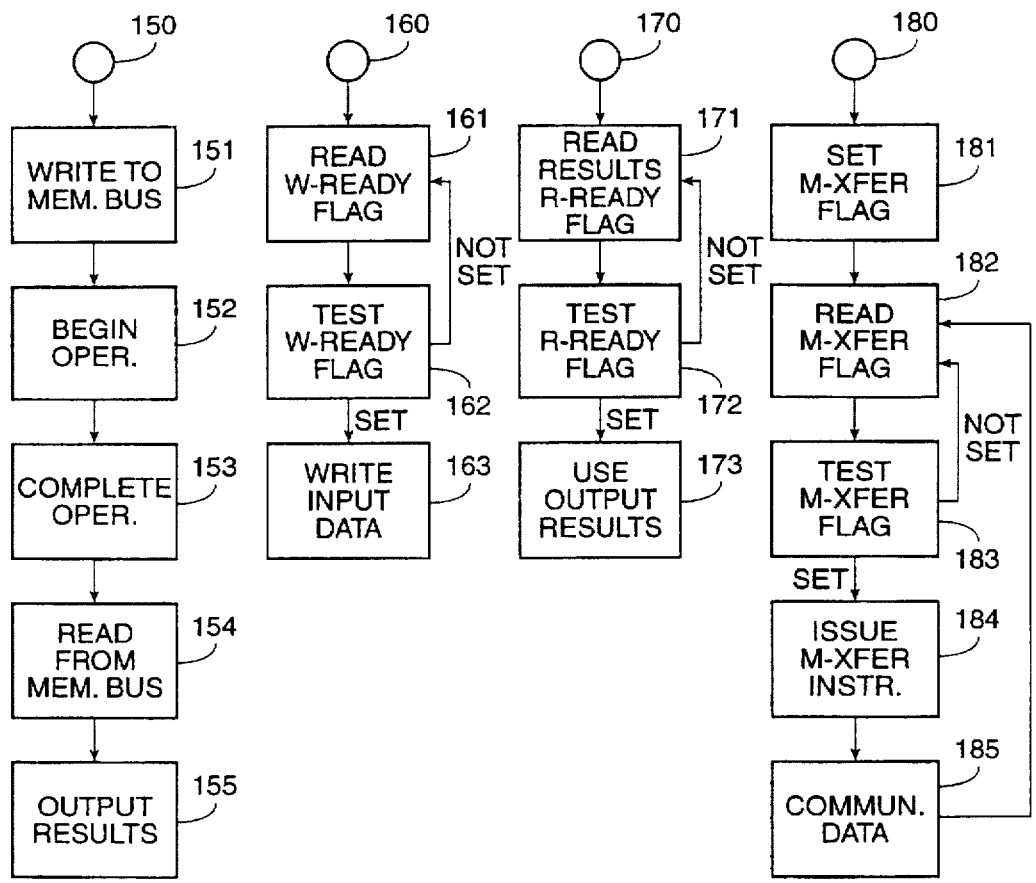
FIG. 1B shows a flow diagram of a method for using a coprocessor, coupled to a processor and memory as shown in FIG. 1A.

FIG. 1A shows a block diagram of an arrangement for coupling a coprocessor to a processor and a memory. FIG.

1B shows a flow diagram of a method for using a coprocessor, coupled to a processor and memory as shown in FIG. 1A.

A master device 100, such as a processor, is coupled to a memory 101 using a memory bus 102. The memory bus 102 comprises a set of control signal lines 103, a set of address lines 104, and a set of data lines 105. In a preferred embodiment, the master device 100 is an IC (integrated circuit) chip, such as a VLSI chip, and is coupled to the memory bus 102 using a set of pins affixed to the chip. The memory 101 comprises a set of IC memory chips, such as DRAM memory chips, coupled to one or more memory boards using a set of pins affixed to each chip, and having the memory boards coupled to the memory bus 102.

Although in a preferred embodiment, the master device 100 is a processor, such as a general purpose processor, a graphics processor, a digital signal processor, or another processor, in alternative embodiments the master device 100 may also comprise another type of device, such as a finite state machine, a programmable ASIC, a specialized computation circuit, or a device controller, disposed for coupling to a memory using a memory bus.

Although in a preferred embodiment, the memory 101 comprises DRAM (dynamic random access memory), in alternative embodiments the memory 101 may also comprise EDO DRAM, VRAM (video RAM), SRAM (static RAM), ROM (read only memory), EPROM (erasable programmable ROM), EEPROM (electrically erasable PROM), NOVRAM (nonvolatile RAM), or other memory circuits.

The Memory Bus

The control signal lines 103 communicate control signals between the master device 100 and the memory 101. These control signals preferably include a RAS (Row Address Strobe) control signal, a CAS (Column Address Strobe) control signal, a WE (Write Enable) control signal, and an OE (Output Enable) control signal. The use of RAS, CAS, WE, and OE control signals with a DRAM memory device is known in the art of computer systems.

The address lines 104 communicate memory address values between the master device 100 and the memory 101. The size of each memory address value depends on the size of the memory address space (i.e., the number of addressable memory locations); for a one million addressable locations, each memory address value would comprise at least twenty bits, since $2^{20}$ is the first power of two to exceed one million.

In a preferred embodiment, the memory 101 is organized or structured as a rectilinear array of memory cells; twenty address bits would comprise ten row address bits and ten column address bits. These row address bits and column address bits are multiplexed onto the address lines 104 in a sequence of time slots, so twenty bits of memory address value would require ten individual lines, communicating twenty bits of address in two sets of ten bits.

The data lines 105 communicate data between the master device 100 and the memory 101. For a read operation, the master device 100 asserts on the address lines 104 the address value for the memory location to be read from, and the memory 101 responds by asserting the data value for that location on the data lines 105. For a write operation, the master device 100 asserts on the address lines 104 the address value for the memory location to be written to, followed by asserting on the data lines 105 the data value to write into that location.

A coprocessor 110 is coupled to the memory bus 102 in like manner as the memory 101. The coprocessor 110 is disposed to read and set the control signal lines 103, to read the address lines 104, and to read and set the data lines 105, so as to communicate with the master device 100 using the memory bus 102 in like manner as a memory 101. The coprocessor 110 is disposed to respond to memory read instructions and memory write instructions for a selected set of memory address values, in like manner as a memory 101; the coprocessor 110 is said to be "mapped" to these memory address values.

At a flow point 150, the master device 100 desires that the coprocessor 110 perform a calculation or other operation. Synchronization between the master device 100 and the coprocessor is discussed herein with regard to the "virtual wait signal".

At a step 151, the master device 100 performs a write instruction on the memory bus 102, asserting a memory address value on the address lines 104 mapped to the coprocessor 110, and asserting data values on the data lines 105 including input data for the operation to be performed.

At a step 152, the coprocessor 110 receives the write instruction and the input data on the memory bus 102 and begins the operation demanded by the master device 100.

At a step 153, the coprocessor 110 completes the operation demanded by the master device 100.

At a step 154, the master device 100 performs a read instruction on the memory bus 102, asserting a memory address value on the address lines 104 mapped to the coprocessor 110.

At a step 155, the coprocessor 110 receives the read instruction on the memory bus 102. The coprocessor 110 responds by asserting data values on the data lines 105 including output results for the operation just completed.

In alternative embodiments, a second coprocessor 110 may be coupled to the memory bus 102 and mapped to a set of memory address values other than those already mapped to the memory 101 or the first coprocessor 110. The master device 100 communicates with the second coprocessor 110 using read and write instructions to the memory bus 102, asserting memory address values on the address lines 104 mapped to the second coprocessor 110.

Since the memory 101, and each coprocessor 110 act as passive devices on the memory bus 102, there is no special requirement for coordination between the memory 101 and any coprocessor 110, or between any one coprocessor 110 and any other coprocessor 110. There is also no special requirement that the coprocessor 110 is coupled to any bus besides the memory bus 102.

The Virtual Wait Signal

The coprocessor 110 may take longer than a single memory cycle to perform operations demanded by the master device 100, and therefore the coprocessor 110 has a method for informing the master device 100 that the coprocessor 110 is not ready for the next operation. In a preferred embodiment, the coprocessor 110 provides a virtual wait signal, to indicate to the master device 100 whether the coprocessor 110 is ready to perform the next operation.

A selected memory address value is reserved by the coprocessor 110 to provide a set of status flags to the master device 100. These status flags include a write-ready flag 111, for indicating whether the coprocessor 110 is ready to accept input data written to it by the master device 100, and a read-ready flag 112, for indicating whether the coprocessor 110 is ready to provide output results to the master device 100.

At a flow point 160, the master device 100 is ready to provide input data for the coprocessor 110.

At a step 161, the master device 100 reads the write-ready flag 111.

At a step 162, the master device 100 tests the value of the write-ready flag 111. If the write-ready flag 111 is not set, the master device 100 waits a selected period and returns to the step 161. Otherwise the master device 100 proceeds with the step 163.

At a step 163, the master device 100 writes input data to locations mapped to the coprocessor 110.

At a flow point 170, the master device 100 is ready to read output results from the coprocessor 110.

At a step 171, the master device 100 reads both the output results and the read-ready flag 112 from locations mapped to the coprocessor 110.

At a step 172, the master device 100 tests the value of the read-ready flag 112. If the read-ready flag 112 is not set, the master device 100 waits a selected period and returns to the step 171. Otherwise the master device 100 proceeds with the step 173.

At a step 173, the master device 100 uses the output results read from locations mapped to the coprocessor 110.

Coprocessor Use of Memory

When the coprocessor 110 desires to use locations in the memory 101, it asks the master device 100 to execute a block transfer operation between the memory 101 and the coprocessor 110. Block transfer operations between a first and a second memory device 101 using a memory bus 102 are known in the art. In a preferred embodiment, because the coprocessor 110 is coupled to the memory bus 102 as a passive device, it does not interrupt the master device 100 and relies on the master device 100 to poll for the request for a master block transfer instruction.

A selected memory address value is reserved by the coprocessor 110 to provide a set of status flags to the master device 100 for a memory block transfer operation. These status flags include a memory-transfer flag 113, for indicating whether the coprocessor 110 desires to communicate with the memory 101, and if so, the parameters of a memory block transfer instruction the master device 100 should issue to facilitate that communication.

At a flow point 180, the coprocessor 110 is ready to communicate data with the memory 101 using the memory bus 102.

At a step 181, the coprocessor 110 sets the memory-transfer flag 113 in a selected memory location mapped to the coprocessor 110.

At a step 182, the master device 100 reads the memory-transfer flag 113.

At a step 183, the master device 100 tests the memory-transfer flag 113. If the memory-transfer flag 113 indicates that the master device 100 should issue a memory block transfer instruction, the master device 100 proceeds to the step 184. Otherwise, the master device 100 waits a selected period and returns turns to the step 182.

At a step 184, the master device 100 issues a memory block transfer instruction according to the parameters requested by the coprocessor 110.

At a step 185, the memory device 101 and the coprocessor 110 communicate data according to the memory block transfer instruction.

The master device 100 then waits a selected period and returns to the step 182.

In alternative embodiments, where the master device 100 or the memory 101 are not disposed to perform a master block transfer instruction, or where the amount of communication desired between the memory 101 and the coprocessor 110 is limited, the master device 100 may execute repeated reads from the memory 101 and writes to the coprocessor 110 (or for a reverse transfer, reads from the coprocessor 110 and writes to the memory 101) until the desired data communication is achieved.

SYSTEM HAVING CENTRAL PROCESSOR, GRAPHICS PROCESSOR, AND COPROCESSOR

Figure 2A:
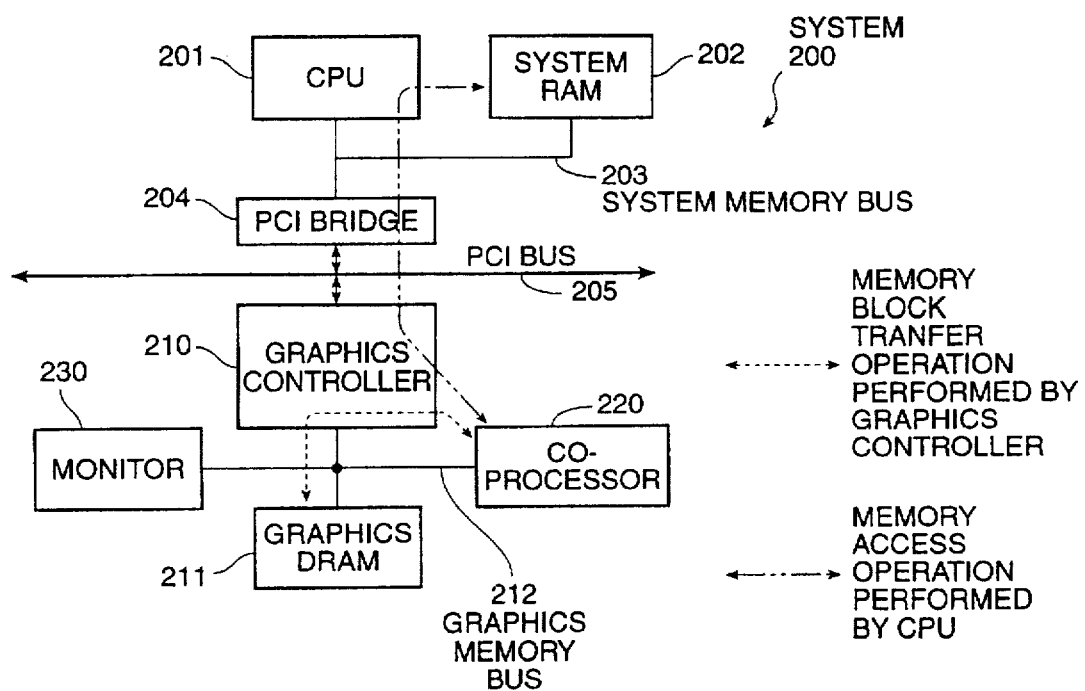
FIG. 2A shows a block diagram a system having a central processor and memory, a graphics processor and graphics memory, and a coprocessor coupled to the graphics processor.
Figure 2B:
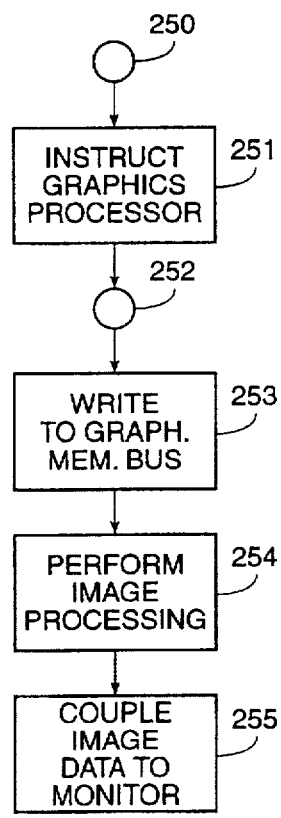
FIG. 2B shows a flow diagram of a method for using the system shown in FIG. 2A.

FIG. 2A shows a block diagram a system having a central processor and memory, a graphics processor and graphics memory, and a coprocessor coupled to the graphics processor. FIG. 2B shows a flow diagram of a method for using the system shown in FIG. 2A.

A system 200 comprises a central processor 201 and a system memory 202, both coupled to a system memory bus 203 in like manner as the master device 100 and the memory 101 are coupled to the memory bus 102 in FIG. 1A.

In a preferred embodiment, the central processor 201 comprises a general purpose processor such as an Intel x86 type processor; such a processor is known in the art of computer systems. The central processor 201 operates under the control of software stored in the system memory 202. The system memory 202 comprises at least four megabytes of DRAM disposed on SIPPs; such memory devices are known in the art of computer systems.

The system memory bus 203 is coupled to a PCI bridge 204, which is coupled to a PCI bus 205. PCI bridges and PCI buses are known in the art of computer systems.

A graphics controller 210 and a graphics memory 211 are coupled to a graphics memory bus 212 in like manner as the master device 100 and the memory 101 are coupled to the memory bus 102 in FIG. 1A.

In a preferred embodiment, the graphics memory 211 comprises two megabytes of DRAM or VRAM, thus requiring 21 address bits and eleven individual lines for the address lines 104 of the graphics memory bus 212.

A coprocessor 220 is coupled to the graphics memory bus 212 in like manner as the coprocessor 110 is coupled to the memory bus 102 in FIG. 1A. One or more additional coprocessors 220 may also be coupled to the graphics memory bus 212 in like manner.

In preferred embodiments, the data lines 105 of the graphics memory bus 212 comprise 32 or 64 individual lines.

In a preferred embodiment, the coprocessor 110 uses two megabytes of memory address space in a range exceeding the two megabytes of memory address space for the memory 101, for a total of four megabytes of mapped memory address space.

The graphics controller 210 is disposed to perform memory block transfers between the graphics memory 211 and the coprocessor 220, in like manner as memory block transfers between the memory 101 and the coprocessor 110 in FIG. 1A.

The graphics controller 210 is also coupled to the PCI bus 205.

In a preferred embodiment, the central processor 201 is disposed to perform memory access operations between the system memory 202 and the coprocessor 220, using the system memory bus 203, the PCI bridge 204, the PCI bus 205, the graphics controller 210, and the graphics memory bus 212. Such memory access operations may comprise burst transfers on the PCI bus 205.

A monitor 230 is coupled to the graphics memory bus 212 and is disposed for displaying images stored in the graphics memory 211.

In a preferred embodiment, the system 200 is used according to a method such as the following:

At a flow point 250, the central processor 201 desires to display processed images on the monitor 230.

At a step 251, the central processor 201 instructs the graphics controller 210 regarding images to display on the monitor 230.

At a flow point 252, the graphics controller 210 requires computational assistance, such as when images to be displayed on the monitor 230 require substantial image processing. This may occur, for example, when the images to be displayed involve 3D processing, JPEG image compression or decompression, MPEG video compression or decompression, or raytracing.

At a step 253, the graphics controller 210 writes to the graphics memory bus 212 to instruct the coprocessor 220 to conduct image processing and to produce the graphic images to be displayed.

At a step 254, the coprocessor 220 performs computations for the image processing and stores processed image data in the graphics memory 211.

At a step 255, the graphics controller 210 couples the processed image data from the graphics memory 211 to the monitor 230 for display.

Alternative Embodiments

Although preferred embodiments are disclosed herein, many variations are possible which remain within the concept, scope, and spirit of the invention, and these variations would become clear to those skilled in the art after perusal of this application.

I claim:

1. A computer system comprising:

a system bus;

a first processor coupled to said system bus;

a first memory bus coupled to said first processor;

a memory coupled to said first memory bus;

a graphics processor coupled to said system bus;

a graphics memory bus coupled to said graphics processor;

a graphics memory coupled to said graphics memory bus, said graphics memory being disposed to respond to a first set of addresses on said graphics memory bus; and a coprocessor coupled to said graphics memory bus, said coprocessor being disposed to respond to a second set of addresses on said graphics memory bus so as to emulate a memory device;

wherein said coprocessor is disposed to receive a set of input data from said graphics memory bus when said graphics processor writes said input data to said graphics memory bus for one of said second set of memory addresses, said coprocessor is disposed to process said set of input data upon receipt to produce a set of output results, and said coprocessor is disposed to transmit said set of output results to said graphics memory bus when said graphics processor reads said output results from said graphics memory bus for one of said second set of memory addresses; and a second coprocessor coupled to said graphics memory bus and disposed to respond to a third set of addresses on said graphics memory bus so as to emulate a memory device.

2. The system in claim 1, comprising a display;

wherein said coprocessor is disposed to compute, in response to said input data, a graphical function responsive to said input data; and said graphics processor is disposed to present an image on said display responsive to said graphical function.

3. The system in claim 2, wherein said graphical function comprises a 3D graphics function, a graphics compression function, a graphics decompression function, a JPEG image function, an MPEG video function, or a raytracing function.

4. The system in claim 1, wherein said graphics processor is adapted to perform a memory operation communicating a data item between said graphics memory and said coprocessor.

5. A method for coupling computer system devices, said method comprising the steps of:

coupling a system bus to a processor;

directly coupling said processor and a memory to a memory bus, said memory bus comprising a set of control signal lines, a set of address lines, and a set of data lines;

directly coupling a coprocessor to said memory bus;

reserving a first set of memory addresses for said memory, and reserving a second set of memory addresses for said coprocessor;

disposing said coprocessor to emulate a memory device so as to receive a set of input data from said memory bus when said processor writes said input data to said memory bus for one of said second set of memory addresses;

disposing said coprocessor to emulate a memory device so as to process said set of input data upon receipt to produce a set of output results; and disposing said coprocessor to emulate a memory device so as to transmit said set of output results to said memory bus when said processor reads said output results from said memory bus for one of said second set of memory addresses;

coupling a second coprocessor to said memory bus; and reserving a third set of memory addresses for said second coprocessor.

6. The method in claim 5, further comprising a step of providing a read-ready flag at said coprocessor, said read-ready flag having a fist read-ready state representative of a condition wherein said coprocessor is ready to transmit said output results.

7. The method in claim 6, further comprising a step of disposing said processor to test said read-ready flag before performing a read operation on said memory bus for one of said second set of memory addresses.

8. The method in claim 5, further comprising a step of providing a write-ready flag at said coprocessor, said write-ready flag having a fist write-ready state representative of a condition wherein said coprocessor is ready to receive said input data.

9. The method in claim 8, further comprising a step of disposing said processor to test said write-ready flag before performing a write operation on said memory bus for one of said second set of memory addresses.

10. The method in claim 5, further comprising a step of disposing said coprocessor to receive a second set of data from said memory when said processor triggers a memory block transfer between a memory coupled to said memory bus and said coprocessor.

11. The method in claim 5, further comprising a step of disposing said coprocessor to transmit a second set of data to said memory when said processor triggers a memory block transfer between a memory coupled to said memory bus and said coprocessor.

12. The method in claim 5, wherein said processor is a graphics processor, said input data are graphics data, and said output results are graphics data, and comprising presenting an image on a display responsive to said output results.

13. A circuit comprising:

a memory bus having a set of control signal lines disposed to communicate a write enable control signal, a set of address lines, and a set of data lines;

a processor coupled directly to said memory bus, said processor having a memory address register coupled to said set of address lines and a memory data register coupled to said set of data lines;

a memory coupled to said memory bus, said memory being disposed to respond to a first set of memory addresses appearing on said set of address lines;

a coprocessor directly coupled to said memory bus, said coprocessor being disposed emulate a memory device so as to respond to a second set of memory addresses appearing on said set of address lines, and having means for performing a computation responsive to said set of data lines and a first state of said write enable control signal, and means for reporting a result of said computation responsive to said set of address lines and a second state of said write enable control signal; and a second coprocessor coupled to said memory bus and disposed to respond to a third set of addresses appearing on said set of address lines on said memory bus.

14. The circuit in claim 13, further comprising a step of a read-ready flag at said coprocessor, said read-ready flag having a first read-ready state representative of a condition wherein said coprocessor is ready to transmit said result.

15. The circuit in claim 13, further comprising means for testing said read-ready flag before said processor performs a read operation on said memory bus for one of said second set of memory addresses.

16. The circuit in claim 13, further comprising a write-ready flag at said coprocessor, said write-ready flag having a first write-ready state representative of a condition wherein said coprocessor is ready to perform said computation.

17. A circuit as in claim 16, comprising means for testing said write-ready flag before said processor performs a write operation on said memory bus for one of said second set of memory addresses.

18. The circuit as in claim 13, wherein said control signal lines are disposed to communicate a block transfer control signal, and said memory is disposed to communicate a set of data items with said coprocessor responsive to said block transfer control signal.

* * * * *